Patented Nov. 20, 1934

1,981,516

UNITED STATES PATENT OFFICE 1,981,516

INTERMEDIATES FOR SECONDARY ALKYLATED RHODAMINE DYES

Lucas P. Kyrides, Buffalo, N. Y., assignor to National Aniline & Chemical Company, Inc., New York, N. Y., a corporation of New York No Drawing. Application December 1, 1928, Serial No. 323,191

20 Claims. (Cl. 260—128)

The present invention relates to new secondary alkylated rhodamine dyestuffs and to processes for producing the same. The invention also includes new intermediate compounds as well as the processes whereby said intermediate compounds are produced.

The new secondary-alkylated rhodamine dyestuffs, in their esterified form, are represented by the following probable formula:

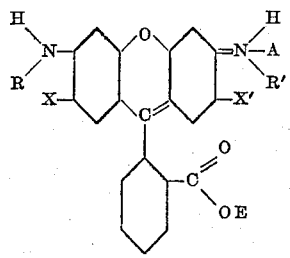

(1)

wherein X and X' are like or unlike substituents and represent hydrogen or an alkyl group, R and R' represent like or unlike alkyl groups excepting isopropyl of which at least one is a secondary alkyl group having more than three carbon atoms, E represents an alkyl group, for example, methyl, ethyl, amyl, etc., and A represents an acidic anion, for example -Cl, ½-SO₄, etc. The new rhodamine dyes give dyeings which are of a bluer and brighter shade than those obtained with the rhodamine dyestuff as heretofore prepared (see C. I. No. 752).

The new secondary-alkylated rhodamine dyes may conveniently be prepared by esterifying with a suitable alcohol in the presence of an esterification catalyst, the new secondary-alkylated rhodamine bases having the following probable formula:

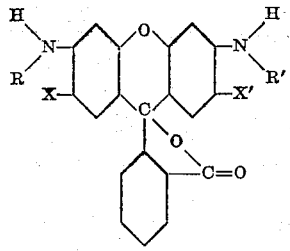

(2)

wherein X and X' are like or unlike substituents and represent hydrogen or an alkyl group, and R and R' represent like or unlike alkyl groups, excepting isopropyl, of which at least one is a secondary alkyl group having more than three carbon atoms. The esterification may be accomplished with methyl alcohol, ethyl alcohol, fusel oil, or any other suitable alcohol. As esterification catalysts may be mentioned hydrochloric acid, sulfuric acid, etc.

The new secondary-alkylated rhodamine bases may conveniently be prepared by condensing with phthalic anhydride, singly or in admixture with other alkylamino phenols excepting isopropyl-aminophenols, the new secondary alkyl aminophenols which may be represented by the following probable formula:

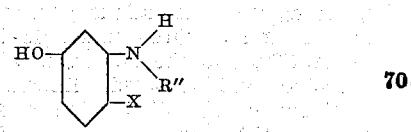

wherein X represents hydrogen or an alkyl group, and R'' represents a secondary alkyl group having more than three carbon atoms. The said aminophenols may be prepared by fusing with caustic alkali the new secondary-alkylarylamino sulfonic acids of the benzene series having the following probable formula:

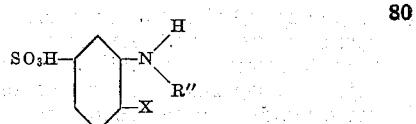

wherein X represents hydrogen or an alkyl group, and R'' represents a secondary alkyl group, having more than three carbon atoms, which latter may be prepared by condensing a secondary-alkyl halide having more than three carbon atoms with a primary aminoarylsulfonic acid of the benzene series. Alternatively, the said secondary-alkylarylamino sulfonic acids may be prepared by condensing a secondary alkyl halide having more than three carbon atoms, with an aryl amine of the benzene series, and sulfonating the resulting secondary alkylarylamine having the following probable formula:

wherein X represents hydrogen or an alkyl group, and R'' represents a secondary alkyl group having more than three carbon atoms.

The invention is particularly concerned with the new secondary butylated rhodamines, which may be derived in the manner outlined above from the new secondary butylaminoarylsulfonic acids having the following probable formula:

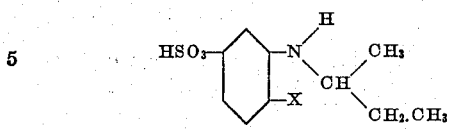

wherein X represents hydrogen or an alkyl group, by converting them into the corresponding new amino phenols having the following probable formula:

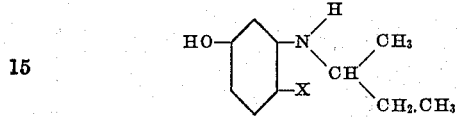

wherein X represents hydrogen or an alkyl group, condensing said aminophenols with phthalic anhydride alone or in admixture with other alkylaminophenols, excepting secondary propylaminophenols, to produce the secondary-butylated rhodamine bases defined in formula (2) above, and esterifying said rhodamine bases.

In preparing the new secondary-alkylated rhodamine dyes of the present invention in accordance with a preferred method of procedure, a primary aromatic amine (for example aniline, o- or p-toluidine, o-ethyl aminobenzene, etc.) is heated with a secondary-alkyl halide containing more than 3 carbon atoms, to produce the corresponding secondary alkylarylamines. The resulting reaction mixture is made alkaline and allowed to stratify, and the oily layer which appears is collected and distilled. Depending upon the efficiency of the distillation and fractionation, there is obtained the corresponding mono-secondary-alkyl aromatic amine.

A mono-secondary-alkyl aromatic amine containing more than 3 carbon atoms in the alkyl group prepared as above described, or in any other convenient manner, is sulfonated by treatment with oleum containing an amount of $SO_3$ in excess of that theoretically required to convert the secondary-alkyl aromatic amine into the corresponding mono-sulfonic acids. The sulfonation mass is drowned in cold water, and the sulfonic acids are separated as the free acids, or as their corresponding alkali-metal salts, in any convenient manner. The mixture of isomeric mono sulfonic acids obtained in this way may be further treated to isolate the meta-alkylaminoarylsulfonic acid. However, it has been found that upon fusing the mixture of isomeric alkylaminoarylsulfonic acids with caustic alkali, for the production of alkylamino phenols, substantially only the meta-alkylaminophenol is produced. The meta-alkylaminoarylsulfonic acid, therefore, need not be isolated from the mixture of isomers.

A meta-secondary-alkylaminomonosulfonic acid, or a mixture of isomers thereof, is converted into the corresponding meta-secondary-alkylaminophenol by heating with potassium hydroxide, or with a mixture of potassium and sodium hydroxides, preferably while excluding air by maintaining a blanket of an inert gas (such as, superheated steam, ammonia, nitrogen, etc.) over the surface of the melt. The melt is then diluted with water, and the secondary alkylaminophenol is precipitated by the addition to the diluted fusion mass of a mineral acid (such as, sulfuric acid) in just sufficient amount to render the diluted melt slightly alkaline to phenolphthalein, or the separation may be accomplished in any other convenient manner. The mono meta-secondary alkylaminophenol may be purified, if desired, and the purified product may be condensed with phthalic anhydride for the production of a rhodamine base, or the unpurified product may be employed in a similar manner. Also, the condensation may be carried out by employing a mixture containing a mono secondary alkylaminophenol with any other alkylaminophenol. The condensation mass, in any case, is hydrolyzed with dilute caustic alkali, and the resulting secondary-alkylated rhodamine base is separated, and is converted, by esterification with a suitable alcohol and an esterification catalyst, into the secondary-alkylated rhodamine dyestuff, which can be obtained directly by evaporating to dryness the esterification mass.

The rhodamine dyestuffs thus obtained when pulverized are red to brown powders, soluble in water with a greenish fluorescence, and dyeing textile fibers bluish and bright shades of red having a high degree of fastness.

For a better understanding of the invention, reference should be had to the following specific examples wherein are described and illustrated representative products and preferred methods for producing them in accordance with the invention; but it is to be understood that the invention is not limited thereto. The parts are by weight.

*Preparation of mono-secondary-alkyl arylamine*

Example 1.—111 parts o-toluidine is heated to boiling under reflux with 150 parts secondary-butyl bromide until the reaction is substantially complete (about 24 hours). The solution is then made alkaline by the addition of dilute caustic soda to liberate the free base from its hydrobromide, and the mixture is allowed to stratify. The oily layer is separated, washed with water and fractionated through an efficient column, the fraction boiling between about 230° to 240° C. being collected. This consists of crude mono o-secondary-butylamino toluene which can be used without further treatment for the preparation of the corresponding mono sulfonic acid derivative. If desired, however, the crude oil can be redistilled and fractionated, whereby an oil consisting of substantially pure secondary-butylamino toluene can be obtained having a boiling point of about 235° C., and having the folowing probable formula:

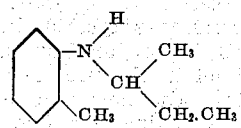

If in the above example, aniline is used instead of ortho-toluidine, secondary butyl aniline having a boiling point of about 228°–230° C. may be obtained. In place of the butyl bromide disclosed in the above example, its equi-molecular proportions of secondary-butyl chloride or iodide may be employed, or higher secondary-alkyl halides such as the halides of the following groups may be employed:

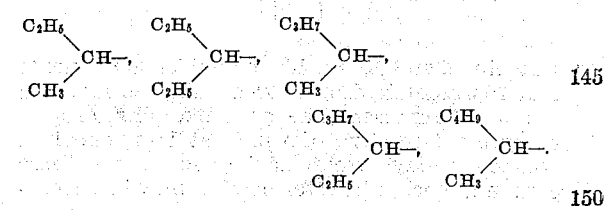

Preparation of mono-secondary-alkylamino aryl sulfonic acid

*Example 2.*—108 parts crude o-mono-secondary-butylamino toluene, obtained as described in Example 1, is added in portions to about 150 parts of agitated sulfuric acid (100%) maintained below about 50° C. The mixture is then cooled to about 0° C., about 200 parts of 65% oleum is added, and sulfonation is allowed to continue at about 0° C. until substantially complete. The reaction mass is then drowned in an ice and water mixture, the product is allowed to crystallize, and the crystals are filtered and washed acid free with cold water. If desired, they may be dried; but drying is not essential if said product is to be used in a subsequent step in the preparation of rhodamine dyestuffs.

The product obtained in accordance with the above example comprises a mixture of sulfonic acid derivatives of o-mono-secondary-butylamino toluene, being mainly a mixture of 3-secondary-butylamino-4-methyl benzenesulfonic acid and 4-secondary-butylamino-3-methyl benzenesulfonic acid. By carrying out the sulfonation at a higher temperature, e. g. 70–80° C., the reaction is completed in a much shorter period of time without deleteriously affecting the results.

If desired, the mixed product may be resolved into its constituent parts by fractional crystallization, and the 3-butylamino benzene sulfonic acid derivative may be alone employed in preparing a rhodamine dyestuff; but such treatment is not necessary when the product is employed in the preparation of a rhodamine in accordance with the process of the present invention, inasmuch as it has been found that the 3-butylamino benzene sulfonic acid derivatives are alone converted to the corresponding phenolic compounds by fusion with caustic, the 4-butylamino benzene sulfonic acid derivatives being eliminated in the fusion.

By substituting corresponding molecular proportions of mono-secondary-butyl aniline, or a higher secondary-alkyl-amino derivative of aniline, o-toluidine, o-amino ethyl-benzene, or the like, for the secondary-butylamino toluene employed in the above example, and by proceeding in an analogous manner, the corresponding mono-secondary-alkylamino aryl sulfonic acids may be obtained.

Preparation of secondary-alkyl amino phenol

*Example 3.*—150 parts of potassium hydroxide is fused in an iron fusion pot equipped with a cover and agitator. While maintaining the temperature at about 220°–230° C. and passing superheated steam over the surface of the melt, there is added with agitation 130 parts of the sulfonic acid mixture obtained in accordance with Example 2, and comprising a mixture of 3-secondary-butylamino-4-methyl benzene sulfonic acid and 4-secondary-butylamino-3-methyl benzene sulfonic acid, about an hour and a half being required for the addition. The melt is heated for an additional period of about 4 hours, or until the reaction is completed, at a temperature of about 250° C., preferably while maintaining the agitation and the passage of superheated steam over the surface of the mass. The melt is then allowed to cool while still maintaining the blanket of superheated steam, preferably with agitation, and when sufficiently cooled, though still at a temperature above the melting point of the mass, the passage of superheated steam is interrupted, and water is cautiously added. The resulting solution is filtered to remove iron oxides and other impurities, and the filtrate is treated with sulfuric acid until just slightly alkaline to phenolphthalein, the temperature preferably being above about 60° C., that is, above the melting point of the resulting phenolic compound produced. On cooling, the mono-secondary-butylamino cresol separates as a thick oil, the oil is shaken with a small amount of dilute sodium carbonate to decompose any aminophenol sulfate still present, and is then separated by decantation, and washed with cold water. The product may be used directly in the preparation of a rhodamine base by condensation with phthalic anhydride in accordance with the following example. If desired, it can also be extracted from the aqueous mixture with ether or other suitable solvent. The product obtained comprises mono-secondary-butyl amino cresol, in the form of a thick oil, boiling at about 180°–189° C. under 30 mm. pressure. If desired, by a fractional distillation of the oil, the pure product can be obtained having a boiling point of about 180°–182° C. under 30 mm. pressure, and having the probable formula:

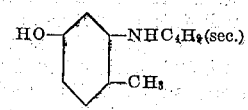

During the fusion process, the 3-secondary-butylamino-4-methyl-benzene-sulfonic acid is converted into 3-secondary-butylamino-4-methyl phenol, whereas the other isomeric sulfonic acids are not converted to the corresponding phenols; so that starting with a mixture of isomeric sulfonic acid derivatives, a product is obtained consisting substantially of 3-secondary-butylamino-4-methyl phenol.

If in the above example, there is substituted for the secondary-butylamino-methyl-benzene sulfonic acids, the corresponding molecular quantities of secondary-butylamino benzene sulfonic acids, or other homologous mono-secondary-alkylamino benzene sulfonic acids, corresponding meta-mono-secondary-alkylamino phenols (cresols and homologs) will be obtained.

Preparation of rhodamine base.

*Example 4.*—A mixture of about 15 to 18 parts of phthalic anhydride and 15 parts of the 3-mono-secondary-butylamino-4-methyl phenol obtained as described in Example 3 is heated at about 180°–190° C. with slow agitation, preferably while preventing access of air to the reaction mixture. Agitation is then discontinued, the mass solidifies, and heating is continued until the condensation is complete (an additional period of about 3 hours), the temperature still being maintained at about 180°–190° C. The mass is then allowed to cool, is broken into lumps or ground to a powder, and the rhodamine base is isolated therefrom by treatment of the lumps or powder with dilute caustic alkali, preferably with the aid of heat. The resulting rhodamine base is filtered, washed and preferably dried. The product obtained is di-secondary-butyl rhodamine base, being a red to brown solid and having the probable formula:

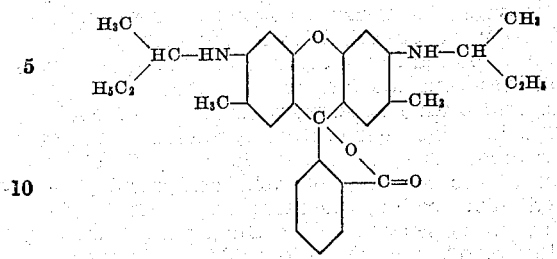

By substituting corresponding molecular amounts of meta-mono-secondary-butylamino phenol or a higher meta-secondary-alkylamino phenol, cresol, or a homolog, for the amino cresol employed in the above example, corresponding rhodamine bases may be obtained, which are also red to brown solids. It is to be noted, that in the above example, substantially the same yields are obtained in the absence of a condensing agent as when a condensing agent is employed.

Preparation of rhodamine dyestuff

*Example 5.*—A mixture of 20 parts of the di-secondary-butyl rhodamine base obtained in accordance with Example 4, about 20 parts of sulfuric acid (66° Bé.), and about 60 parts of methanol, is refluxed at its boiling point for about 20 hours, or until the esterification is substantially complete. The resulting solution is then poured into about 500 parts of cold water, and if necessary, common salt (NaCl) is added, preferably with agitation, until the dyestuff is substantially completely separated. The mother-liquor is carefully removed by decantation or filtration, and the dyestuff is washed with a dilute (about 10%) salt solution. The product is then boiled up with about 500 parts of water and the solution is filtered clear while hot. About 60 parts of concentrated hydrochloric acid is then added to the clear hot filtrate, preferably with agitation, the solution is cooled, the dyestuff is allowed to separate, and is removed and dried. It is the methyl ester of di-secondary-butyl rhodamine, being when pulverized a red powder, soluble in water with a greenish fluorescence, dyeing cotton mordanted with tannin bluer and brighter shades of red than Rhodamine 6G (C. I. 752), and having the probable formula:

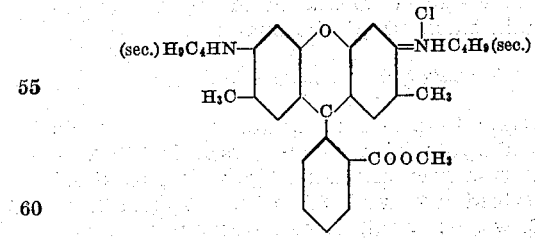

By substituting a corresponding homologous rhodamine base for the di-secondary-butyl rhodamine base of the above example, and by employing ethyl alcohol or another alcohol instead of methanol, dyestuffs may be produced which are similar in properties to those of the di-secondary-butyl rhodamine of the above example.

It is to be understood that the invention is not limited to the above specific examples, but that the various proportions, ingredients, conditions and manipulations described in said examples are subject to variation within the scope of the claims.

Thus, in the preparation of the secondary-alkyl aromatic amine, the secondary alkyl chloride, bromide or iodide may be employed, the reaction preferably being carried out under pressure in the case of the lower boiling chloride in order to secure a more elevated reaction temperature and a correspondingly shorter reaction period. With the higher boiling alkyl bromides and higher alkyl chlorides this is not essential, however, since the boiling point of the mixture is sufficiently high. The alkylation of the amine can also be carried out by passing vapors of the secondary alkyl halide into the heated aromatic primary amine.

Furthermore, a mixture of primary aromatic amines or a mixture of alkyl halides or mixtures of both can be used, whereby a mixture of alkylamines and mixed dyestuffs as well as mixtures of dyestuffs and of intermediate products will be obtained.

In recovering the mono-secondary-alkyl aryl amine from the reaction mixture, other alkalis may be used instead of sodium hydroxide; such as, potassium hydroxide, sodium carbonate, potassium carbonate, and the like.

In sulfonating the mono-secondary-alkyl aryl amine, the strength of the oleum may be varied and various proportions of oleum and sulfuric acid may be used, provided only that there is present in the reaction mixture an excess of $SO_3$ over that theoretically required to mono-sulfonate the secondary-alkyl amine. The process can also be varied in that the oleum and secondary-alkyl amine can be mixed in the cold and then brought to the reaction temperature. The sulfonation temperature can be varied from about 0° to about 100° C., although temperatures below about 80° C. are preferred, the higher temperatures requiring less time for the completion of the sulfonation. Instead of separating the sulfonic acids from the sulfonation mixture as the free acids, they may also be separated as the alkali-metal salts in any well known manner; as for example, by diluting the sulfonation mixture with water, liming out, removing the calcium sulfate, converting the calcium sulfonates to the corresponding alkali-metal salts by treatment with alkali-metal carbonate, and concentrating the resulting solution or evaporating to dryness. The resulting alkali-metal salts of the mono-secondary-alkylamino aryl sulfonic acids, either in the form of their concentrated solutions or in the dry form, may be subjected to the caustic fusion process above described for the preparation of the corresponding aminophenols instead of the free sulfonic acids.

In carrying out the fusion to form the secondary-alkylamino phenol, part of the potassium hydroxide may be replaced by sodium hydroxide. The superheated steam employed to form an inert atmosphere over the surface of the fusion mass is preferably superheated to the fusion temperature, but it may be heated to any desired temperature, and need not even be superheated provided sufficient heat is supplied to the fusion mass to maintain it at the desired fusion temperature. If desired, other inert gases such as ammonia, nitrogen, etc. may be employed instead of the superheated steam.

In recovering the mono-secondary-alkylamino phenol from the fusion mixture by treatment with sulfuric acid, instead of adding sulfuric acid until just slightly alkaline to phenolphthalein, the solution can be made acid to phenolphthalein with sulfuric acid and then brought back to slight alkalinity by the addition of alkali-metal carbonate. Instead of isolating the aminophenol in accordance with the method described, the fusion mass may be diluted with water, acidified with an excess of mineral acid, boiled to eliminate SO2 and the resulting solution neutralized with sodium carbonate.

In working up the reaction mixture resulting from the condensation of the meta-mono-secondary-alkylamino phenol with phthalic anhydride, other alkali-metal hydroxides may be employed, such as, potassium hydroxide or ammonium hydroxide, but sodium hydroxide is to be preferred.

In preparing the rhodamine dyestuff by esterification of the corresponding rhodamine base, alcohol saturated with HCl gas can be substituted for the mixture of alcohol and sulfuric acid, and furthermore, the esterification can be performed with an alkyl halide instead of an alcohol and an esterification catalyst.

It will be understood that the process of the invention is not limited to the preparation of rhodamine dyestuffs and intermediates from intermediate products which have not been substantially completely purified, but that the invention also includes within its scope the preparation and employment of purified products and intermediates.

The secondary alkylated rhodamines, and more particularly, the isopropylated rhodamines and intermediates therefore are described and broadly claimed in my copending application, Serial No. 323,187 filed of even date herewith.

I claim:

1. An alkylaminophenol having the general formula:

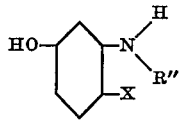

wherein X represents hydrogen or an alkyl group, and R'' represents a secondary alkyl hydrocarbon radical having more than three carbon atoms.

2. A mono-secondary-aralkyl amino aromatic compound having the general formula:

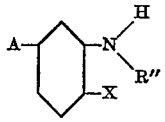

wherein X represents hydrogen or an alkyl group, R'' represents a secondary alkyl hydrocarbon radical having more than three carbon atoms, and A represents hydrogen, an -OH group, an -SO3H group, or an alkali metal salt of a sulfonic acid group.

3. A butylaminophenol having the general formula:

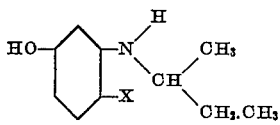

wherein X represents hydrogen or an alkyl group.

4. Butylaminocresol having the formula:

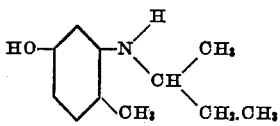

5. An alkylamino aryl sulfonic acid having the general formula:

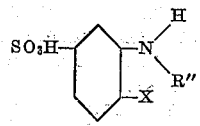

wherein X represents hydrogen or an alkyl group, and R'' represents a secondary alkyl group having more than three carbon atoms.

6. A butylaminoaryl sulfonic acid having the general formula:

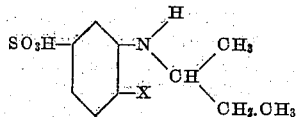

wherein X represents hydrogen or an alkyl group.

7. Butylaminomethylbenzene sulfonic acid having the formula:

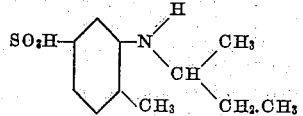

8. An alkylarylamine having the general formula:

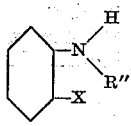

wherein X represents hydrogen or an alkyl group and R'' represents a secondary alkyl hydrocarbon radical having more than three carbon atoms.

9. A butylarylamine having the general formula:

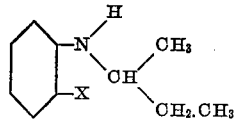

wherein X represents hydrogen or an alkyl group.

10. Butyltoluidine having the formula:

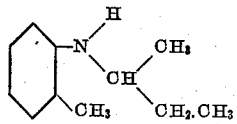

11. The process which comprises heating a primary arylamine of the benzene series with a secondary alkyl halide having more than three carbon atoms, to produce the corresponding mono secondary alkylarylamine having more than three carbon atoms in the secondary alkyl group, mono sulfonating said alkylarylamine to produce the corresponding mono meta-secondary alkylarylamine mono sulfonic acid and fusing said sulfonic acid with caustic alkali to produce the corresponding mono meta-secondary alkylaminophenol.

12. The process which comprises heating a primary arylamine of the benzene series having the general formula

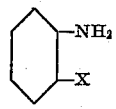

in which X represents hydrogen or an alkyl group, with a secondary alkyl halide having more than three carbon atoms, to produce the corresponding mono-secondary-alkylarylamine having more than three carbon atoms in the secondary alkyl group, mono sulfonating said alkylarylamine to produce a mixture of the corresponding mono - secondary-alkylarylamine monosulfonic acids, and fusing said mixture of sulfonic acids with caustic alkali to produce the corresponding meta-mono-secondary-alkylamino-phenol.

13. The process which comprises heating a primary arylamine of the benzene series with a secondary butyl halide to produce the corresponding mono secondary butylarylamine, mono sulfonating said butylarylamine to produce the corresponding mono - meta - secondary butylarylamine mono sulfonic acid, and fusing said sulfonic acid with caustic alkali to produce the corresponding mono meta-secondary butylaminophenol.

14. The process which comprises heating o-toluidine with secondary butyl halide to produce the corresponding mono o-secondary butyltoluidine, mono sulfonating said butyltoluidine to produce a mixture of secondary-butyl-o-toluidine mono sulfonic acids, and fusing said mixture of sulfonic acids with caustic alkali to produce mono meta-secondary butylamino-o-cresol.

15. The process which comprises heating a primary arylamine of the benzene series with a secondary alkyl halide having more than three carbon atoms to produce the corresponding mono secondary alkylarylamine having more than three carbon atoms in the secondary alkyl group, and mono sulfonating said alkylarylamine to produce the corresponding mono meta secondary alkylarylamine mono sulfonic acid.

16. The process which comprises heating a primary arylamine of the benzene series with secondary butyl halide, to produce the corresponding mono secondary butylarylamine, and mono sulfonating said butylarylamine to produce the corresponding mono meta-secondary butylarylamine mono sulfonic acid.

17. The process which comprises heating o-toluidine with secondary butyl halide to produce the corresponding mono secondary butyltoluidine, and mono sulfonating said butyltoluidine to produce mono meta-ortho-secondary butyltoluidine mono sulfonic acid.

18. The process which comprises heating a primary arylamine of the benzene series with a secondary alkyl halide having more than three carbon atoms, to produce the corresponding mono-secondary alkylaraylamine having more than three carbon atoms in the secondary alkyl group.

19. The process step which comprises heating a primary arylamine of the benzene series with secondary butyl halide to produce the corresponding mono secondary butylarylamine.

20. The process which comprises heating o-toluidine with secondary butyl halide to produce mono o-secondary butyl-toluidine.

LUCAS P. KYRIDES.